May 29, 1915.

DRAWING

233

A careful search has been made this day for the original drawing or a photolithographic copy of the same, for the purpose of reproducing the said drawing to form a part of this book, but at this time nothing can be found from which a reproduction can be made.

Finis D. Morris,
                                                  Chief of Division E.

(AWK.)

UNITED STATES PATENT OFFICE.

BANCROFT WOODCOCK, OF MOUNT PLEASANT, PENNSYLVANIA.

IMPROVEMENT IN PLOWS.

Specification forming part of Letters Patent No. 233, dated June 14, 1837.

*To all whom it may concern:*

Be it known that I, BANCROFT WOODCOCK, of Mount Pleasant, in the county of Westmoreland and State of Pennsylvania, have invented certain Improvements in Plows; and I do hereby declare that the following is a full and exact description thereof.

The share which I use is the same in its general form as that described by me in the specification annexed to Letters Patent granted to me on the 23d day of November, 1836; but it differs therefrom in its transverse section *a b*, Figure 2, through the part represented by the dotted line *a b*, Fig. 1. The face on each side has its surface flat from each cutting-edge to a shoulder, represented by the line *c d* on one side and on the opposite side by the dotted line *e f*. By this means I am enabled to make the share so thin throughout its width that as it wears up toward the mold-board it is still sufficiently so on its edge to pass freely through the ground. It has two holes, *x x*, through it, by one or the other of which it is bolted to the mold-board.

Fig. 3 is a view of the landside of my plow, within a recess or depression in which I place a reversing cutter, *g g g*, the general form of which is that of a triangle, either end of which may be turned forward, so as to constitute the cutting-edge formed by the junction of the mold-board and landside of the plow. This reversing cutter may be fastened in its place by making it hollow, so as to receive the part *h* of the landside, allowing space enough between the piece *h* and the cutter to insert a wedge or wedges, *i*. The edges of *h* are made dovetailing or beveled, to clip the inner edges of *g* and hold it firmly against the landside when wedged. One of the edges of *g* may reach to the bottom of the landside; or it may stand a little above it, having the strip of iron *j* below it, which strip in this case forms a side of the recess.

I have also made an improvement in the manner of making the renewable point. For the mode in which I formerly made it I refer to the description thereof in the Letters Patent above named. I now prepare a V-formed piece of iron or steel, which fits onto the shank *k*, Fig. 3, embracing it on both sides, as shown at *l l*, and fastened to it by a rivet passing through the whole. The renewable point is thus rendered more permanent than upon the the former plan, and the shank is perfectly protected from grinding out in wear.

In order to secure the landside to the mold-board, I cast the fitting parts with dovetail junctures in such a way as that, when secured together by wedges passed between cheeks adapted to that purpose, the parts interlock, and are retained firmly in their places.

What I claim in reference to the share is—

1. Making it with plain surfaces instead of curved ones, in the manner described, continuing such surfaces to the shoulder on each side, so as to leave the metal throughout so thin that when it wears off by use the share will still present a thin edge to the ground.

2. The reversing cutter, received into a recess or the landside and capable of having either of its edges presented forward, so as to form the cutting-edge of the plow, and secured in its place on the landside by a wedge or wedges, or in any other manner which may be preferred.

3. The mode of forming the renewable point, as herein specifically set forth.

BANCROFT WOODCOCK.

Witnesses:
   THOS. P. JONES,
   M. E. JONES.